United States Patent [19]
Butler et al.

[11] 3,956,585
[45] May 11, 1976

[54] BUCKET-BRIGADE GHOST CANCELLER

[75] Inventors: Walter J. Butler; Charles M. Puckette; James R. Whitten, all of Scotia, N.Y.

[73] Assignee: General Electric Company, Schenectady, N.Y.

[22] Filed: Dec. 23, 1974

[21] Appl. No.: 536,966

[52] U.S. Cl.................. 178/7.3 R; 178/DIG. 44; 325/475; 333/70 T
[51] Int. Cl.².......................................... H04N 3/16
[58] Field of Search............. 178/DIG. 12, DIG. 44; 325/42, 323, 324, 377, 378, 473–476; 333/70 T; 358/36

[56] References Cited
UNITED STATES PATENTS

| | | | |
|---|---|---|---|
| 3,482,168 | 12/1969 | Sasao | 178/DIG. 44 |
| 3,599,108 | 8/1971 | Gardner | 333/70 T |
| 3,613,030 | 10/1971 | Fjallbrant | 333/70 T |
| 3,809,923 | 5/1974 | Esser | 333/70 T |
| 3,868,516 | 2/1975 | Buss | 333/70 T |

OTHER PUBLICATIONS

A. M. Lessman, The Subjective Effects of Echoes in 525– Line Monochrome etc., SMPTE, Vol. 81, p. 907, 12/72.
Urkowitz, H., Analysis & Synth. of Delay Line, etc. *IRE Trans. Ckt. Theory,* Vol. CT-4, No. 2, 6/57.

*Primary Examiner*—Albert J. Mayer
*Attorney, Agent, or Firm*—Stephen B. Salai; Joseph T. Cohen; Jerome C. Squillaro

[57] ABSTRACT

A ghost canceller for the cancellation of a ghost signal from a complex electrical signal including a desired signal component as well as the ghost is provided wherein an electronically variable delay line of the charge transfer type is incorporated in a negative feedback loop. Bucket-brigade and charge-coupled devices may be employed with associated variable frequency clock oscillators to provide remotely variable delay times in an easily implemented structure.

1 Claim, 7 Drawing Figures

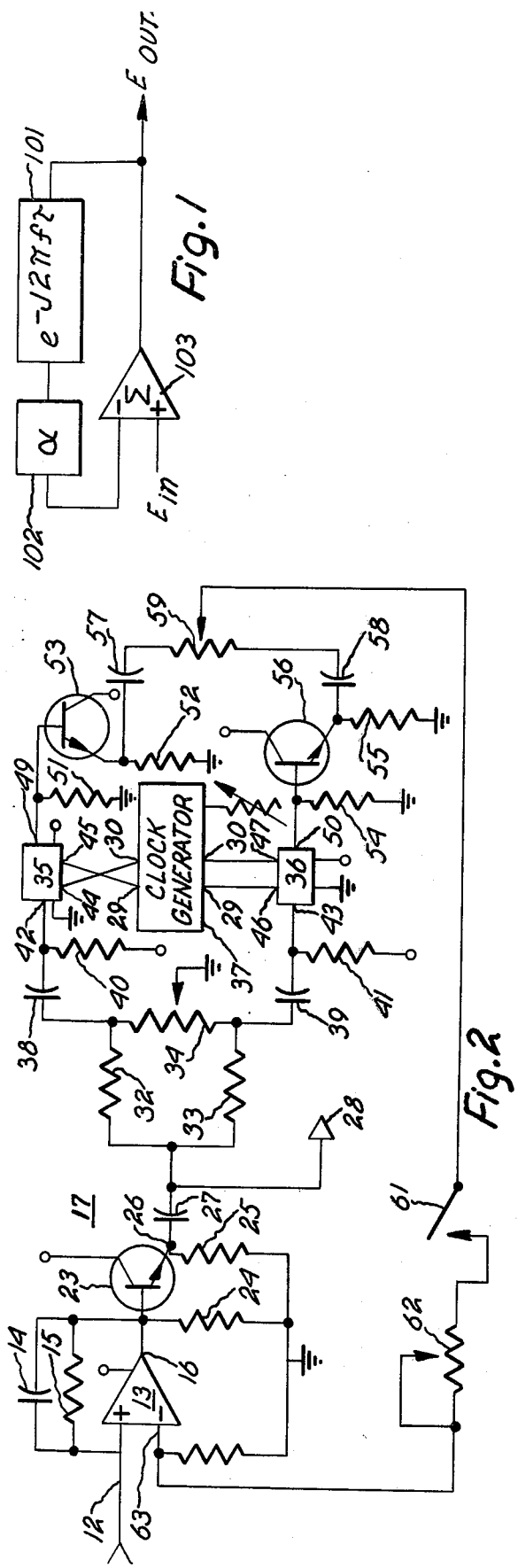
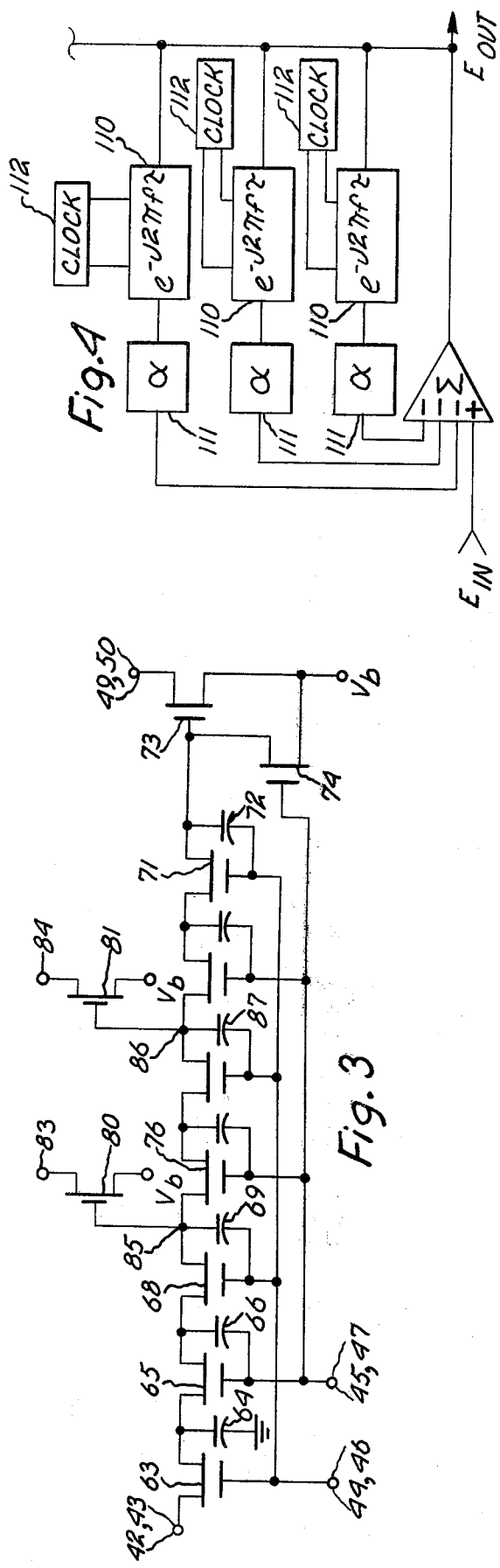

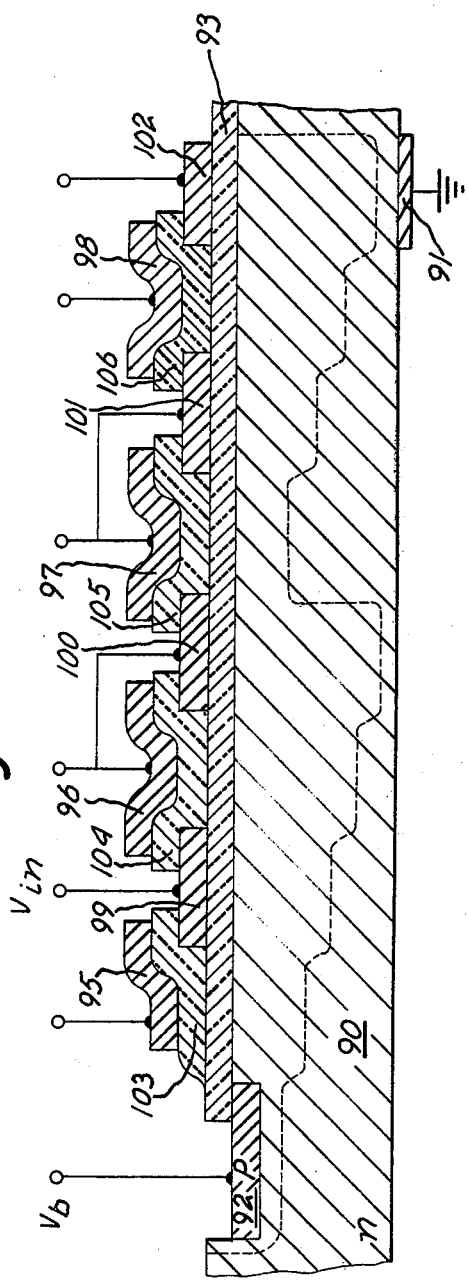
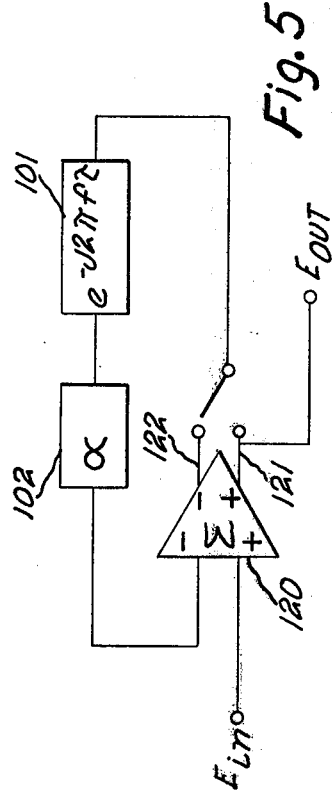
Fig.6
Fig.5

BUCKET-BRIGADE GHOST CANCELLER

This invention relates, in general, to devices for the elimination of unwanted signals from an electrical signal path, and more particularly, to such a device for use in a video signal path for the elimination of delayed and attenuated signals of the type generated by unwanted reflections during the process of transmitting such signals from a transmitter to a receiver.

The problems attendant to the presence of ghosts in video channels are well known, and various means for their elimination, of varying degrees of success, have been heretofore proposed. While this invention will be described in accordance with a preferred embodiment thereof especially suited to be applied to the video portion of a television receiver, it is to be understood that the invention disclosed herein is suitable to a wide variety of applications. While a "ghost" is generally construed to apply to a video signal, as used herein, ghost shall conote any undesired signal present in an electrical system having substantially the same waveform as the desired signal, but delayed in time and attenuated in amplitude therefrom. As thus defined, ghosts may arise in an electrical system in a variety of ways. For example, the transmission of a television signal from a transmitter to a remotely located receiver presents an environment for the creation of ghosts in a variety of ways. Considering for a moment only the propagation of energy between the transmitting antenna and the receiving antenna, at least one primary signal path will exist which will produce at the antenna the desired signal. In the most usual case this path will be the shortest path, often the line-of-sight path between the transmitting and receiving antennas. Consequently, this signal will arrive at the antenna prior to and with greater amplitude than any undesired signals. It is often the case that secondary signal paths exist due to reflections from natural or man-made objects which produce undesired signals at the antenna. These signals arrive after a time delay which is a function of the increased path length covered by the reflected signal. Also due to the increased path length and the nature of the reflective surface, these undesired signals will be reduced in amplitude from the desired signal. The extent to which ghosts are a problem in a given situation will depend upon the physical relationship between the transmitter, receiver, and reflective objects. Where the undesired signal arrives at the antenna from a direction substantially different from the desired signal, it is often possible to discriminate between the desired and undesired signals through the use of a directional antenna. Such antennae present problems, however, in that they are limited in their capabilities to reject undesired signals arriving at the antennae from directions the same or substantially the same as the desired signal. Furthermore, in some instances space or aesthetic considerations may prevent the use of the often times large and unsightly antennae which would be required to effectively discriminate against an undesired ghost. Assuming for a moment that a signal path is present sufficiently free from the effects of reflective objects that ghosts are not introduced through the propagation process, it is still possible that ghosts may be generated in the transmission line connecting the antenna either at the transmitter or at the receiver end of the system, to the transmitter or receiver. As is well known, the presence of an impedance mismatch will produce a reflection at the juncture of two dissimilar impedances. While these effects are, in general, significantly less important than propagation generated ghosts in a television signal of the type described, they are not to be ignored and insofar as the undesired signal generated is delayed in time and attenuated from the desired signal while maintaining substantially the same wave shape the invention described herein is effective in eliminating it.

The manifestations of ghosts depend, of course, upon the nature of the system in which they are present. In the video portion of a television signal, ghosts appear as secondary images and are, for the most part, easily recognizable, clearly visible and therefore objectionable if present to any significant degree. The nature of television transmission domestically is such that a picture is created by scanning from left to right and from top to bottom as the face of the television picture tube is viewed from the normal viewing position. In the normal course therefore, a ghost image will appear displaced to the right of the desired image by a distance which is proportional to the delay between the arrival of the desired signal at the antenna and the arrival of the undesired ghost signal. This delay is a function of the difference in path length traveled by the desired and undesired signals. While the difference in path length could theoretically be quite long, in general, signals arriving via exceptionally long paths are so severly attenuated as to be imperceptible on the television picture tube. This is due, of course, to the capability of the tube for displaying a wide range of signal levels. Signals which are attenuated sufficiently from the desired signal therefore will, although they are present, not appear as visible ghosts and therefore will not be objectionable. At the other extreme, signals may be present which are delayed only slightly from the desired signal as, for example, when the path lengths are very close. In the extreme case, the delay will be so slight that the displacement of the ghost image from the desired image will be less than the resolution visible on the face of the picture tube. Within these two extremes a wide variety of signals varying both in amplitude and delay time must be within the capability of a workable ghost canceller system.

It is an additional feature of the type of ghost created during the propagation of televison type signals, that from a given receiver location it may be desirable to receive signals which are transmitted from a variety of transmitter locations. As a consequence thereof, the character of ghosts present, if any, during the reception of different television channels may differ dramatically in character, that is to say that the delay times and degrees of attenuation may vary widely from channel to channel. Further, if a given television receiver is to be used in more than one location as, for example, might be the case where televisions are moved between permanent locations or portable televisions are moved from one temporary location to another, similar effects will occur. It is a necessary feature of a ghost cancelling system suitable for incorporation within the television receiver that it be easily adjustable to compensate for the change in attuenation and delay associated with change in location. It is to be understood that where the ability to adjust the cancellation apparatus to accommodate changes in delay and attenuation are not necessary, as for example, in a system where the transmitter and receiver sites are premanently fixed and therefore where the characteristics of the ghost are also permanent that suitable simplifications may be made by eliminating the adjustable features which will be hereinbelow described and substituting therefore semipermanent or one-time-only type adjustments.

A ghost canceller suitable to be incorporated into a television receiver for use as a consumer product is subject to requirements preculiar to that application. For example, extremely low cost and ease of operation are essential, reliability is important and ease of maintenance is also a consideration. In addition, compatibility with solid state circuitry is necessary. In fact, increased reliance on integrated circuit technology in consumer applications makes suitability for integration increasingly important.

As will be discussed at some length in the detailed description of this invention, the synthesis in mathematical terms of a system for the cancellation of a delayed and attenuated signal of substantially the same wave shape as a desired signal from a composite signal which is the sum thereof is well known in the art. While the analysis is to a certain degree sophisticated, it is nevertheless straightforward. The implementation in physical form of such a system, however, is fraught with difficulties. The elements of a system which may be easily and precisely defined mathematically are often times extremely difficult to implement, and the integration of such a system with a complete receiving system suitable for use by a wide variety of unsophisticated and substantially untrained persons presents a great variety of problems. It is to those problems that this invention is addressed. Electrical devices for the cancellation of ghosts are known in the art, as for example, as illustrated by a U.S. Pat. No. 3,482,168 to Saburo Sasao. Such devices generally have, as might be expected, substantially similar methods of overall operation. The prior art methods and apparatus for implementation, however, have been to a large extent awkard, requiring, for example, complex electromechanical lumped constant delay lines of the type providing discrete, quantized delay time variations, and which due to their physical construction and myriad discrete parts were difficult to manufacture, complicated to adjust and subject to untimely failure due, if for no other reason, to their complexity.

For these reasons, a ghost canceller of the type described in the patent to Sasao is entirely unsuited to be included in a television receiver for consumer use. The cost of such a device alone would completely foreclose its use, not even considering the complexity, difficulty of manufacture, alignment and adjustment. While the cost of a ghost canceller cannot be estimated with certainty, a ghost canceller in accordance with this invention can be expected to be constructed for a cost approximating an order of magnitude less than prior art types, while at the same time providing improved operating convenience and ease of construction thereover.

It is, therefore, an object of this invention to provide a ghost canceller for removing an undesired delayed and attenuated signal having substantially the same waveshape as a desired signal from an electrical system wherein both signals are present which is suitable for incorporation into a wide variety of electrical receiving systems.

It is another object of this invention to provide a ghost canceller which is easy to implement, simple to manufacture, well suited to be formed in integrated fashion and inexpensive. It is a further object of this invention to provide a ghost canceller which is especially suited to be incorporated in a television receiver.

It is still a further object of this invention to provide a ghost canceller which eliminates the need for complex unreliable electromechanical delay lines.

Briefly stated, and in accordance with one exemplary embodiment of this invention, a charge transfer delay line ghost canceller includes an electrical summer having an input adapted to receive a complex electrical signal including both the desired signal and the undesired ghost signal; a charge transfer delay line and an adjustable attenuator serially connected in feedback circuit relationship with the summing means, and wherein an output signal which is characterized by including only the desired signal is taken from the output of the aforementioned summing means.

The features of the invention which are believed to be novel are pointed out with particularity in the appended claims. The invention itself, however, both as to its organization and method of operation together with further objects and advantages thereof may best be understood by reference to the following description taken in connection with the accompany drawings in which:

FIG. 1 is a block diagram of a system for the elimination of ghosts in accordance with this invention.

FIG. 2 is a schematic diagram of a ghost canceller in accordance with one embodiment of this invention.

FIG. 3 is a schematic diagram of a bucket-brigade delay line suitable for use in a ghost canceller in accordance with this invention.

FIG. 4 is a block diagram of another embodiment of this invention.

FIG. 5 is a block diagram of a ghost canceller in accordance with this invention for the cancellation of positive and negative ghosts.

FIG. 6 is a sectional view of a charge transfer delay line suitable for use in a ghost canceller in accordance with this invention.

Figure 7:
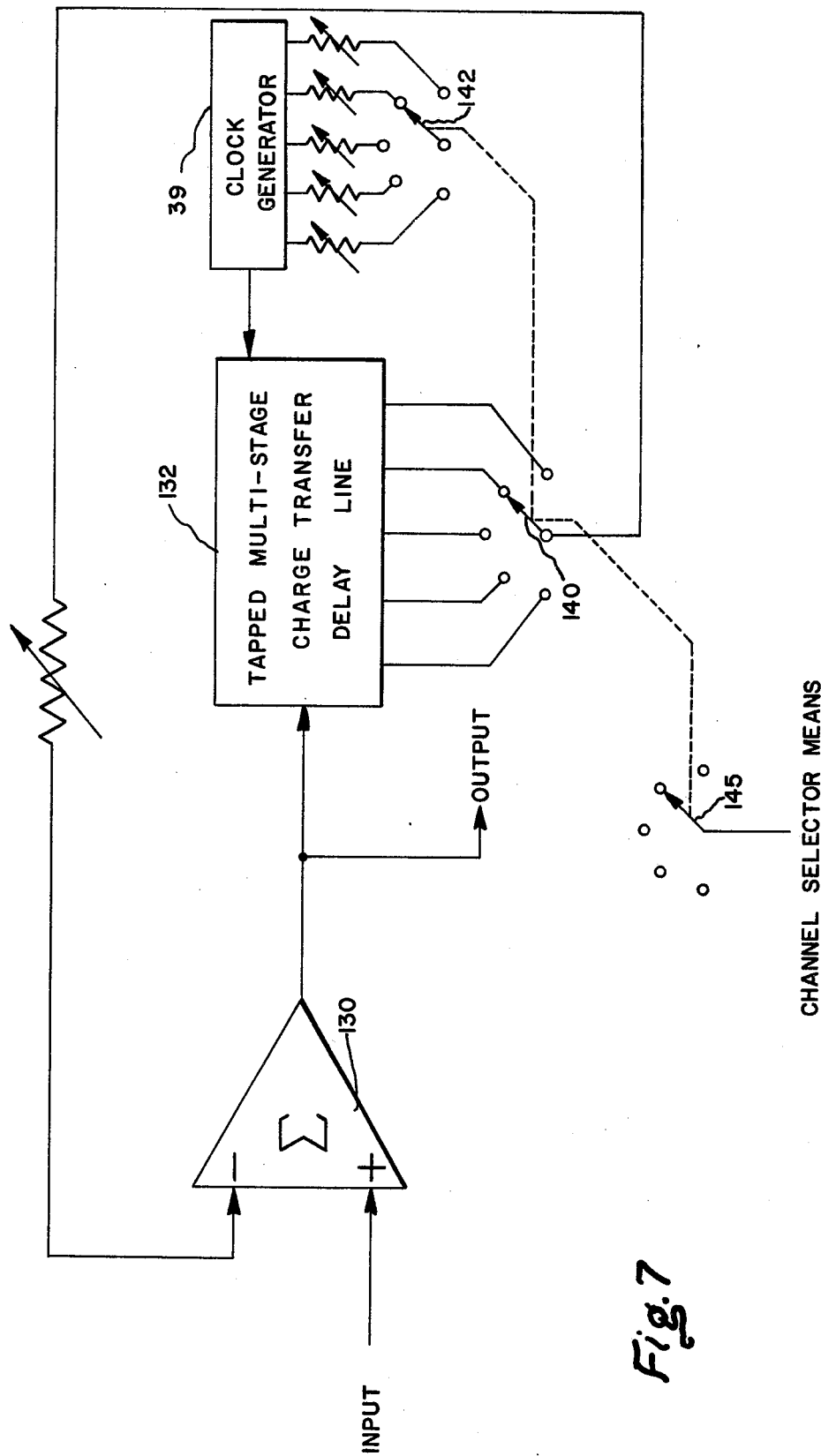
FIG. 7 is a block diagram of a ghost canceller in accordance with this invention in accordance with another embodiment of this invention.

In order to most easily understand the operation of this invention, it will be helpful to review briefly the derivation of the block diagram of FIG. 1. The composite signal, which is made up of both the desired signal and the undesired ghost signal may be represented as:

$$V_R(t) = V_D(t - T) \pm \alpha V_D(t - T - \tau)$$

wherein $V_R(t)$ is the composite signal, $V_D(t - T)$ is the desired signal as a function of time delayed by T the propagation time over the direct path, $\alpha$ is the attenuation of the ghost signal, and $V_D(t - T - \tau)$ is the ghost signal as a function of time including both the propagation time T and the delay time $\tau$. This expression may conveniently be re-written as follows:

$$V_R(t) = V_D(t) * [\alpha(t-T) + \alpha\delta(t-T)-\tau)]$$

wherein the * is the convolution operator and $\delta$ is the dirac delta. This expression may be re-written by removing T to he $V_D(t)$ term as follows:

$$V_R(t) = V_D(t-T) * [\delta(t) + \alpha\delta(t-\tau)]$$

Taking the fourier transform of each side of this equation yields $$F[V_R(t)] = V_D(f) e^{-j2\pi fT} [1 + \alpha e^{-j2\pi f\tau}]$$

wherein $V_D(f)e^{-j2\pi fT}$ is the transfer function of the desired signal path and $1 + \alpha e^{-j2\pi fT}$ introduces the ghost signal. It is clear that in order to remove the undesired ghost signal the ghost suppressor system transfer function must be the reciprocal of $1 + \alpha e^{-j2\pi fT}$ or $$\frac{1}{1 + \alpha e^{-j2\pi fT}} = \frac{E_o(f)}{E_i(f)}$$

or $$E_o(f) = E_i(f) - E_o(f)^{-j2f}$$

FIG. 1 illustrates in block diagram form one system having the desired transfer function. As will be appreciated, the $e^{-j2\pi fT}$ block 101 is a delay line, the $\alpha$ block 102 is an attenuator, and amplifier 103 is a differential amplifier. Both of these elements will be more fully described infra.

FIG. 2 is a schematic diagram of a ghost canceller in accordance with one exemplary embodiment of this invention. Input 12 of amplifier 13 is adapted to receive the complex signal including both the desired signal and the undesired ghost signal. Capacitor 14 and resistor 15 connected in feedback relationship around amplifier 13 provide the required frequency response and gain characteristics to pass the input signal appearing at input 12 without degradation. The bandwidth and gain of amplifier 13 as adjusted by capacitor 14 and resistor 15 are chosen depending upon the nature of the input signal. For example, where the input signal is a television video signal, the bandwidth would preferably be chosen to pass without attenuation the expected high and low frequency components of such a signal, for example, a bandwidth approximating 4 Megahertz. Output 16 of amplifier 13 is connected to emitter follower 17. Amplifier 13 performs the function of the summer of FIG. 1. While in the embodiment illustrated in FIG. 2, one amplifier is used, in order to provide suficient amplification to compensate for the attenuation of the delay line portion if required or to provide additional overall gain for the channel in which it is used, additional amplifiers may be used. That is to say that it may, where desirable, be possible to substitute the ghost canceller of FIG. 2 for an existing amplifier. Amplifier 13 is conveniently an integrated amplifier of the type well known to those skilled in the art. The choice of a particular amplifier is dictated by the bandwidth gain and summing requirements of the system. Transistor 23 along with associated resistors 24 and 25 form an emitter follower which is connected to the output of amplifier 13 and provides a low impedance output at the emitter 26 of transistor 23. Capacitor 27 couples the signal appearing at emitter 26 both to output 28 and to the parallel combination of resistors 32 and 33 in combination with potentiometer 34 which provide a means for equalizing the inputs to bucket-brigade delay lines 35 and 36. D.C. blocking capacitors 38 and 39 along with resistors 40 and 41, which are adapted to be connected to a source of bias voltage for the bucket-brigade delay lines 35 and 36 provide the proper signal and bias voltages to inputs 42 and 43 of bucket-brigade delay lines 35 and 36, respectively. Inputs 44 and 45 of bucket-brigade delay line 35 are adapted to be connected to a source of clock pulses having a two-phase digital output. Similarly, inputs 46 and 47 of bucket-brigade delay line 36 are adapted to be connected to said source of clock pulses. Clock generator 37 provides a source of square wave voltages for the operation of bucket-brigade delay lines 35 and 36. The exact magnitude of these voltages will vary depending upon the particular bucket-brigade delay lines chosen. Typically, voltages which vary from approximately +10 to −10 volts may be utilized. Clock generator 37 is provided with two outputs 29 and 30 which provide complementary voltage waveforms. That is to say that when the voltage at output 29 is high (herein high is used in the conventional logic sense) the voltage at output 30 is low. Outputs 29 and 30 are applied to inputs 44 and 45 and 47 and 46 of BBDLs 35 and 36, respectively. It is to be emphasized that BBDLs 35 and 36 are substantially identical and therefore that the input 44 of BBDL 35 corresponds to input 46 of BBDL 36 and that the clock voltages are applied thereto in a substantially out-of-phase manner. It will be appreciated therefore that while the signal inputs 42 and 43 and outputs 49 and 50 of BBDL's 35 and 36 are substantially in phase, the outputs 49 and 50 will be out of phase and provide cancellation of certain output frequency components with respect to clock generator 37 which will be described in greater detail infra. The outputs 49 and 50 of BBDLs 35 and 36, respectively, are connected to emitter followers comprising resistors 51, 52 and transistor 53 and resistors 54, 55 and transistor 56, respectively. Capacitors 57 and 58 and potentiometer 59 provide a method for obtaining an output from push-pull BBDLs 35 and 36 which may be accurately balanced therebetween. The balanced output of potentiometer 59 is connected through switch 61 and variable resistor 62 to input 63 of amplifier 13. Switch 61 disables the ghost canceller by interrupting the negative feedback path whereby the output appearing at output terminal 28 will be identical to the input applied to input terminal 12 save only for the change in gain provided by amplifier 13 and emitter follower 17. Potentiometer 62 is provided to allow adjustment of the gain of the negative feedback loop so as to permit precise cancellation of the undesired ghost signals. Variable resistor 62 corresponds to gain factor means 102 indicated in the block diagram of FIG. 1. It is to be understood that the schematic diagram of FIG. 2 is exemplary and many variations will occur to one skilled in the art. For example, the functions of amplifier 13 and emitter follower 17 are conventional, and any particular arrangement of components which provides the necessary functions to wit the summing of two inputs, input 12 and negative feedback input 63 along with providing the required amplification, if any, may be utilized. Similarly, while bucket brigade delay lines are utilized at 35 and 36, it is to be understood that any charge transfer delay lines including surface charge transfer devices, charge coupled devices and bucket brigade delay lines which provide the required delay along with the ability to be controlled by external clock generation means are suitable. For purposes of this invention devices of this type will be referred to generally as charge transfer delay lines. While the exemplary embodiment of FIG. 2 utilizes "push-pull" bucket brigade delay lines, it is again emphasized that this particular configuration is not essential to the operation of this invention, and that a single bucket-brigade delay line or other charge transfer delay line may be effectively utilized. The exemplary embodiment illustrated in FIG. 2 provides many advantages and is considered to be the preferred embodiment of this invention.

Substantial attenuation of the clock noise may be accomplished through the utilization of two charge transfer delay lines connected in the manner illustrated in FIG. 2. Input signals are applied in phase to the two delay lines while clock pulses are applied to the said delay lines in an out-of-phase manner. As was previously mentioned, clock generator 37 provides two distinct output waveforms which are 180° different in phase one with respect to the other. The odd harmonics of the clock spectrum are 180° out-of-phase at the output of one of the charge transfer delay lines with respect to the output of the other charge transfer delay line and therefore cancellation of the clock spectrum occurs when the outputs are summed, as for example in FIG. 2 at potentiometer 59. While the extent of cancellation cannot be expected to be complete due to imprecise matching of the devices and phase irregularities in the clock generator to name only two considerations, it has been found that the attenuation of the undesirable clock spectrum is substantial and is enhanced by the substantial direct addition of the desired spectrum components of the two charge transfer delay lines. In fact, the use of push-pull charge transfer delay lines illustrated in FIG. 2 makes possible a ghost canceller not requiring any filtering to eliminate clock components beyond that normally provided in the amplifier circuits of the video receiver to which the ghost canceller in accordance with this invention is to be applied.

In order to further understand the operation of the instant invention, it will be helpful to review briefly the structure of one charge transfer delay line suitable for incorporation in the circuit of FIG. 2.

A bucket-brigade circuit provides one means for realizing an electronically variable delay line which has many advantages over mechanical or lumped constant delay lines. In our particular invention, the BBDL is utilized in a ghost canceller circuit having electronically controlled response characteristics. The BBDL may be generally described as a series array of capacitors interconnected by suitable electronic switches which typically may be transistors of the bipolar, MOSFET or JFET type as three examples. The field effect transistor is preferred in the BBDL due to the base leakage current inherent in bipolar type transistors. Information can be stored in such array of capacitors and is propagated through the array at a rate determined by the (clock) rate at which the switches are sequentially opened and closed. The bucket-brigade circuit, therefore, provides a noninductive means for implementing an analog delay line, the delay period of which is controlled by an external clock. Recent advances in microelectronic technology permit implementation of our canceller in single monolithic integrated circuit form.

A typical BBDL is illustrated in FIG. 3 which corresponds to charge transfer delay lines 35 and 36 of FIG. 2, and which is similarly referenced, and consists of an input sampling stage, a plurality of delay line stages, and an output source-follower stage. The input sampling stage of the BBDL consists of a first electronic switch, a MOSFET 63 in this particular illustration, having source electrode connected to the input terminal of 42, 43 the filter, its gate electrode connected to terminals 44, 46 supplied with square wave pulses generated by digital clock 37, and its drain electrode connected to a grounded capacitor 64 and to the source electrode of a MOSFET 65. The input signal sampling interval $T_s$ is thus controlled by the frequency of the clock pulses.

The plurality of delay line stages are formed by serially connected pairs of bucket-brigade stages. Each pair of bucket-brigade stages includes two serially connected electronic switches (MOSFETS illustrated herein) and a capacitor connected across the drain and gate electrodes of each transistor. The gate electrode of the first transistor is also connected to the complementary clock pulse line 45, 47 whereas the gate electrode of the second transistor is also connected to clock pulse line 44, 46. Thus, capacitor 66 is connected across the drain and gate electrodes of transistor 65, the gate electrode of transistor 65 is connected to the complementary clock pulse line, and the drain electrode is connected to the source electrode of transistor 68 which together with capacitor 69 forms the second half of the first pair of delay line stages. Thus, capacitor 69 is connected across the drain and gate electrodes of transistor 68 and the gate electrode is also connected to the common clock pulse line 44, 46. The drain electrode of transistor switch 68 is connected to the source electrode of transistor 70 in the following pair of bucket-brigade stages are serially connected in the same manner as the first stage. The number of pairs of bucket-brigade stages is determined primarily by the BBDL time delay, $\tau$ which is the primary control of the ghost canceller delay time.

The last bucket-brigade stage of the BBDL consists of transistor 71 and capacitor 72 connected across its drain and gate electrodes. The gate electrode of transistor 71 is also connected to the common clock pulse line 44, 46, the source electrode is connected to the drain electrode of the previous bucket-brigade stage, and the drain electrode could comprise the output of the BBDL. However, for purposes of isolating the output of the BBDL, a source follower stage 73 is connected to the drain electrode of transistor 71, the source follower comprising a transistor have its gate electrode connected to the drain electrode of transistor 71, its drain electrode connected to a source of direct current bias voltage $V_b$ and its source electrode being the output terminal of the BBDL. A transistor 74 having its source electrode connected to the drain electrode of transistor 71 and its drain electrode connected to the source of bias voltage $V_b$ and its gate electrode connected to the common complementary clock pulse line 45, 47 is utilized as a switching device for precharging the last capacitor 72 in the BBDL to a full charge, that is, transistor 74 permits filling the last "bucket" in accordance with conventional operation of BBDLs wherein the fullness of the buckets (the capacitive storage elements) proceeds from the last stage toward the first stage and the emptiness of such buckets, which contains the information (sampled analog input signal to be propagated through the BBDL, proceeds from the first to the last stage. Thus, transistor 74 functions as a switch for providing (in conjunction with bias voltage $V_b$) full charge of capacitor 72 prior to receiving an analog signal sample. The signal information is represented by the extent to which a full bucket is emptied, that is, the signal propagation through the BBDL from the input to the output ends is effected by means of a charge deficit transfer.

The implementation of a ghost canceller in accordance with this invention requires that the charge transfer delay lines 35 and 36 of FIG. 2, along with the clock generator 37 be selected both to provide the required maximum and minimum delays and to be compatible with each other. Generally, it may be said that short delays are obtained by utilizing high clock generator frequencies in combination with or, in the alternative, short, that is to say having a small number of stages, delay lines. Similarly, long delay times may be obtained with low clock generator frequencies and/or by utilizing long, that is to say, delay lines having a large number of stages. An additional feature of charge transfer delay lines is that the bandwidth is proportional to the clock frequency and the transfer inefficiency. More specifically, the relationship may be expressed as $$A(f) = \exp\left\{-n \epsilon \cos\left(\frac{2\pi f}{f_c}\right)^2\right\}$$

where $A(f)$ is the amplitude of the output signal as a function of frequency, $n$ is the number of stages, $\epsilon(f_c)$ is the transfer inefficiency which occurs at the clock frequency $f_c$ and $f$ is the frequency of interest. A high bandwidth results when the clock frequency is high compared to the frequency of the signal being delayed, the bandwidth being reduced as the clock frequency is reduced. This may be verified with reference to the above-mentioned relationship between bandwidth, clock frequency, signal frequency and transfer inefficiency. Assuming, for purposes of example that the clock frequency is chosen to be two times the frequency of the delayed signal, in the case of a video signal, twice the highest frequency component so that $f/f_c$ is ½, $n = 200$, and setting $A(f)$ equal to 0.7, which corresponds to approximately 3db attenuation, then it is required that the transfer inefficiency of the device be $1.8 \times 10^{-4}$ at the clock frequency. While transfer inefficiency is a function of the particular device utilized, the method of manufacture, and sundry other conditions, it can be said that at the frequencies with which we are concerned, transfer inefficiencies of $1.8 \times 10^{-4}$ are readily obtainable, both in bucket-brigade structures, and in other charge transfer delay lines. Sampling theory indicates that the highest frequency component which can be recovered from a sampled signal is one half of the sampling frequency. See, for example H. S. Black, "Modulation Theory", Chapter 4, P. Van Nostrand Company, Inc., Princeton, N.J., 1953. With these things in mind, along with the additional considerations that practical manufacturing difficulties prevent the construction of arbitrarily long, that is having a large number of stages, charge transfer delay lines, it willbe possible to, by way of example, illustrate the selection of the appropriate device parameters in accordance with one exemplary embodiment of this invention. By way of example, therefore, assume that the ghost canceller in accordance with this embodiment is to be utilized as a video ghost canceller. In order to allow the ghost canceller in accordance with this invention to pass without significant degradation a color television signal, a bandwidth of approximately 4 Megahertz is required. It is emphasized that this figure is to be considered by way of example only, it being realized that in some applications the bandwidth of as high as 6 Megahertz may be required for acceptable operation. Assuming, however, that 4 Megahertz is required, a minimum clock frequency of 8 Megahertz is therefore dictated. The minimum and maximum delays must now be considered. It is felt that a minimum delay of approximately the width of one line, that is to say a horizontal displacement on a video cathode ray tube approximately the same length as the vertical displacement between lines will provide acceptable resolution in all cases. This is to say that ghosts displaced from the primary signal by less than the width of one line will not be visually objectionable and therefore will not require elimination. The delay time required, therefore, will be approximately 0.2 microseconds. The maximum delay required for the effective cancellation of any visible ghosts likely to be present is somewhat more difficult to determine. While arbitrarily long delays that are theoretically possible, they are very unusual due to the losses inherent in the propagation process. Recalling that the displacement of the visible ghost on the face of the video cathode ray tube is directly related to the difference in path length traversed by the desired and undesired signals and recalling also that increased path length will necessarily mean increased atttenuation notwithstanding additional attenuation due to imperfect reflection, it is clear therefore, that arbitrarily long delays are not a problem. Experience indicates that to a first approximation, ghosts of sufficient magnitude to be objectionable are substantially always found to be displaced from a desired signal by a distance no greater than one third the width of the raster. This distance corresponds to a time of approximately 20 microseconds. Recalling that the minimum clock frequency is 8 Megahertz, and realizing that the delay provided by a bucket-brigade structure of the type hereinabove described is equal to one-half the number of stages times the clock period and that the period of an 8 Megahertz signal is 0.125 microseconds, in order to obtain a 20 microsecond delay a 320 stage device is necessary. As will be hereinafter discussed, by utilizing a push-pull configuration of charge transfer delay lines, an effective sampling rate twice the clock rate is realized. Reconsidering the previous example, a 20 microsecond delay may be obtained with push-pull 160 stage devices by utilizing a 4Mhz clock rate. For a more complete discussion of the use of push-pull devices in general, see for example, W. J. Butler et al., "Practical Considerations for Analog Operation of Bucket-Brigade Circuits", *IEEE Journal of Solid State Circuits*, Vol. SC-8, No. 2, April 1973.

To obtain a 25 microsecond maximum delay time from a 200 stage push-pull ghost canceller as hereinabove described will require a 250 Megahertz clock rate to obtain the minimum delay time of 0.2 microseconds which is required as hereinabove stated. A clock frequency range of 4 to 250 Megahertz is therefore indicated. While clock generators having the capability to provide 4 to 250 Megahertz outputs are available, they will be both expensive and difficult to implement. Therefore, in order to provide the required maximum and minimum delay times while maintaining a rangeof clock oscillator frequencies easily achieved, it is a feature in accordance with yet another aspect of this invention to provide tapped charge transfer delay lines. In order to determine the precise location of the taps in order to achieve the desired range of delay times, let us assume that clock generator means are available having a range of output frequencies varying from 4 Megahertz to 12 Megahertz. As the push-pull arrangement will effectively double the clock sampling frequency, the number of stages required to achieve a 0.2 microsecond delay time is 10. It is apparent that in order to obtain a complete range of delay times within the limits of 0.2 microseconds to 20 microseconds, it will be necessary to incorporate a large number of taps. The number of taps is, of course, reduced as the range of oscillator frequencies is increased. Referring again to FIG. 3, there is shown a method in accordance with this invention for tapping the bucket-brigade delay line illustrated therein. Only two taps are illustrated by way of example, source followers 80 and 81. Output terminals 83 and 84 which are the source terminals are adapted to be connected to the output of the delay line. Gate terminal 85 of source follower 80 is shown connected to capacitor 69. Gate 86 of source follower 81 is shown connected to capacitor 87. Drain terminals $V_b$ of both devices are connected to a source of bias voltage as was hereinbefore discussed in accordance with FIG. 3. While only two source followers are shown in addition to the final source follower 73, it is to be understood that source followers may be provided in and to the extent required to provide the full range of delay times in accordance with this invention. Where a push-pull arrangement of bucket-brigade delay lines is utilized as, for example, in the circuit of FIG. 2, it is clear that source follower 80 must be provided in both delay lines and that they must be selected by any convenient method to provide equal delays in each delay line. Where charge transfer delay lines are used with other than bucket brigade delay lines, taps may also be provided although the method therefore will vary slightly.

FIG. 6 illustrates the structure of another type of charge transfer delay line suitable for incorporation in this invention. As the type of charge transfer delay line to be herein described is not readily represented in schematic form, FIG. 6 is the physical structure of the charge transfer delay line to be described. The structure and operation of the type of charge transfer delay line to be described are more fully set out in U.S. Pat. application Ser. No. 391,632 of William E Engeler and Jerome J. Tiemann, entitled "Method and Apparatus for Processing Electrical Signals along a Semiconductor Substrate", filed on Aug. 27, 1973 and of common assignee herewith, the contents of which are herein incorporated by reference.

The operation of surface charge transfer device suitable for incorporation in accordance with this invention to a ghost canceller of the type hereinbefore described will now be described in conjunction with FIG. 6. While surface charge transfer delay lines may be constructed having p-type and n-type substrates. FIG. 6 illustrates the latter type. n-type substrate 90 is provided with an ohmic contact 91 which is adapted to be connected to ground, and which further may be of any convenient type. p-type input diffusion region 92 is adapted to be connected to a constant d.c. voltage source which in combination with the clock voltages and the input terminal as to be hereinbelow described cooperates therewith to form the input charge packet. Insulating region 93 is provided in laminar relationship with n-type substrate 90. Metallized regions 95 through 98 and 99 through 100 are provided with regions 95 through 98 separated from insulative layer 93 by additional insulating layers 103 through 106. Metallization regions 99 through 102 are in laminar relationship with insulating region 93. There is formed thereby a structure wherein a first set of metallization regions in intimate contact with insulating region 93 are provided at a relatively close spacing with respect to n-type substrate 90, and a second set of metallizations 95 through 98 is provided removed an additional distance from n-type substrate 90. It can be seen, therefore, that a voltage applied to one of the close spaced, relative to n-type substrate, metallization creates a depletion region extending more deeply into n-type substrate 90 than an equal voltage applied to one of metallizations 95–98. As will be hereinbelow described, this arrangement of metallizations provides for a predictable direction of charge transfer. Input diffusion 92 in cooperation with metallizations 95 and 99 provide for the creation of a charge packet to be transferred along the surface of n-type substrate 90. It is emphasized that the dimensions in FIG. 6 are not to scale and especially that the depth of the diffusion relative to the thickness of n-type substrate 90 is greatly exaggerated for purposes of clarity. By way of example, assume that terminal 91 is connected to ground, that input diffusion 92 is connected to a source of constant voltage, typically −10 volts, that the input signal is connected to metallization 99, and that terminals 95–98 and 100–102 are connected to a source of clock pulses to be hereinafter described. Assume as a starting point that the voltage applied to metallization 95 is low, for example, −20 volts. The surface potential under metallization 99 equilibrates with the voltage applied to input diffusion 92 and the charge stored under metallization is proportional to the voltage applied thereto. Assume now that the voltage applied to metallization 95 increases to zero volts. The charge hereinbefore stored under metallization 99 is thereby trapped, and the magnitude thereof is proportional to the signal applied to metallization 99 during the previous portion of the herein described cycle. Referring now to metallizations 96 and 100 shown here in externally connected together, a low voltage applied thereto will cause a generally step shaped diffusion region to be formed thereunder and the charge packet hereinbefore described as trapped under input metallization 99 will be transferred thereto. During this period, it is assumed that metallizations 97 and 101 are held at a high (or zero volt) state and, therefore, that the charge transferred to the depletion region under metallization 100 will remain there. The voltages applied to metallizations 96 and 100 on the one hand and 97 and 101 on the other hand are now reversed causing the depletion region especially under metallization 100 to decrease in depth of penetration, and the depletion regions under metallizations 97 and 101 to increase in depth. It is seen, therefore, that the charge previously trapped in the depletion region underlying metallization 100 will be transferred first to the depletion region underlying metallization 97 and thence to the depletion region underlying terminal 101. It is clear that the rate at which the charge packet is transferred along the surface of the n-type substrate is related to the rate at which the voltages applied to the metallizations herein described are clocked from the high to low states and vice versa. While the mechanism herein described is somewhat different from the mechanism of operation of the bucket-brigade delay line, it is seen that the effect is analogous and that the devices may be used interchangeably.

It is a feature of surface charge transfer devices of the type illustrated in FIG. 6 that outputs may easily be derived from intermediate taps as well as from the final metallizations thereof. For example, consider metallizations 98 and 102 of FIG. 6. It is clear that as charges transfer into the depletion region beneath metallization 102, equal and opposite amounts of charge must flow into metallization 102. It is clear, therefore, that the signal which is introduced at metallization 99 may be recovered from metallization 102 by connecting a charge sensitive amplifier thereto and monitoring the charge provided during the transfer of the charge packet from the depletion region underlying metallization 98 to the depletion region of the underlying metallization 102. Where metallizations 98 and 102 are merely additional stages in a longer surface charge transfer device, they will be connected to each other and supplied with clock pulses in a way similar to that described for metallization pairs 96 and 100, and 97 and 101.

An alternate method for obtaining an output signal from a charge transfer device of the type described in conjunction with FIG. 6 is to provide a floating output diffusion adjacent to the metallization from which the output is desired to be obtained. This method is well known to those skilled in the art and is described, for example, in a paper by Lampe, White, Fagan and Mims entitled "An Electrically-Re-programmable Analog Transversal Filter", *ISSCC Digest of Technical Papers*, Page 156–157; February 1974.

As was hereinabove mentionin in conjunction with the discussion of the schematic diagram of FIG 2, the push-pull arrangement of the charge transfer delay lines therein illustrated as advantageous in that the noise generated by the switching of the devices making up the charge transfer delay line is substantially reduced at the output. This may be most readily understood by considering first the output spectrum of a single charge transfer delay line. Two distinct components will be present, a first component having the spectrum of the input signal modified by the bandwidth of the charge transfer device, and a second component due to the clock generator. Since as was hereinbefore mentioned, the lowest permissible sampling frequency is approximately twice the desired bandwidth, the spectrum of noise generated by the clock signals is higher in frequency than the desired signal spectrum. As the clock pulses are substantially square wave in shape, and therefore have a high harmonic content, and additionally since there are products generated which are equal to the sum and difference of the signal and clock frequencies, there can be a certain overlap between the spectrum of the desired signal and the clock spectrum. Clock spectrum components which appear within the spectrum of the desired signal will appear on the video cathode ray tube as extraneous and therefore objectionable signals. One method for eliminating this clock noise is to provide a low pass filter either in the ghost canceller circuit or in the television receiver itself with a cut-off frequency as close as possible to the upper frequency limit of the desired signal. In certain instances. it may be possible to rely upon the bandwidth of the existing amplifiers in the television receiver to provide sufficient attenuation of the undesired clock noise spectrum.

An additional advantage to be realized from the use of push-pull charge transfer delay lines is that the sampling frequency is doubled. Recalling that the first order products, that is to say the products generated at the clock frequency plus and minus the signal frequency of interest are effectively cancelled by the push-pull configuration, it is clear that no overlap will occur unless the maximum signal frequency of interest is equal to the actual clock frequency. As the actual clock pulses are out-of-phase the sampling rate for purposes of the sampling theorem is the sum of the clock rates of the individual charge transfer delay lines or twice the clock frequency. It is clear, therefore, that by utilizing the push-pull configuration, substantially lower clock rates can be utilized than would be possible using a single ended configuration.

While the push-pull configuration hereinabove described is preferably utilized when the advantage of halving the minimum clock frequency is desired, it is possible in accordance with yet another aspect of this invention to provide cancellation of clock noise by deriving the output from a single charge couple delay line by summing adjacent nodes. It will be recalled from the discussion in connection with FIG. 3 that the clock pulses applied to adjacent transistor switches as, for example, 68 and 76 of FIG. 3 are out-of-phase. Therefore, if the output signal is taken as the sum of the signals appearing across the capacitors associated with the switches hereinbefore mentioned, the clock pulses will effectively cancel while the desired signals being in phase will add.

In accordance with another embodiment of this invention, FIG. 4 is a block diagram of a ghost canceller for the elimination of multiple ghosts. It will be appreciated that the block diagram is generally similar to that of FIG. 1 with the addition of additional charge transfer delay line means 110 and additional gain factor means 111 in parallel with the delay line means and gain factor means of FIG. 1. As in the ordinary case, multiple ghosts will arrive having different delays, it is necessary to provide distinct clock generator means 112 for each delay line. Similarly, as the amplitudes of the undesired ghosts may also vary widely separate gain factor means are required to be associated with each delay line. While the delay lines of FIG. 3 are shown in block diagram form, it is to be understood that the implementation thereof may vary in accordance with the principles hereinbefore discussed in connection with FIG. 2. That is to say that charge transfer delay lines may be used either individually or in push-pull fashion for each of the delay line blocks of FIG. 3.

FIG. 5 shows a ghost canceller in accordance with this invention having the additional capability of cancelling both positive and negative polarity ghosts. The block diagram of FIG. 5 is substantially identical to that of FIG. 1 save only that the summer 120 is provided with both positive 121 and negative 122 outputs. Positive output 121 is equivalent to the single output of the summer of FIG. 1 while the negative output provides a signal which is 180° shifted in phase with respect to the signal at the positive output. This permits the cancellation of both positive and negative ghosts. The creation of negative ghosts can be easily understood with reference to the following discussion. Assume that $$V(t) \cos \omega t$$

is the desired radio frequency signal, wherein V(t) is a positive function describing the video information. The ghost signal which it is desired to eliminate will therefore be represented by $$\alpha V(t - \tau) \cos \omega(t - \tau)$$

where $\alpha$ is the attenuation characteristic of the ghost, that is the reduction in amplitude of the ghost as compared to the desired signal, $\tau$ is the time delay between the ghost and the desired signal. The composite signal arriving at the television receiver therefore may be expressed as $$V_R(t) = V(t) \cos \omega t + V(t-\tau) \cos \omega(t-\tau)$$

Expanding the expression describing the ghost signal and re-arranging terms yields $$V_R(t) = \{V(t) + \alpha V(t-\tau) \cos \omega\tau\} \cos \omega t + \{\alpha V(t-\tau) \sin \omega\phi\} \sin \omega t$$

From this expression, it can be seen that where $\alpha$ is relatively small compared to one, which is the usual case, the variation in amplitude of the received signal $V_R(t)$ will be substantially unaffected by the $\sin \omega t$ term. Ignoring this term therefore, the signal from which the video information to be displayed will be derived is $$V_R(t) \approx \{V(t) + \alpha V(t-\tau) \cos \omega\tau\} \cos (\omega t + \phi)$$

where $\Phi$ represents the phase shift due to the $\sin \omega t$ term. The detected video signal, therefore, will be equal to $$V(t) + \alpha V(t-\tau) \cos \omega\tau$$

and it can be seen, therefore, that the magnitude of the ghost varies the the sign of $\cos \omega\tau$ and therefore will be positive or negative depending upon the delay time of the ghost.

The circuit of FIG. 5 can be seen now to provide in accordance with this invention for the cancellation of both the positive and negative ghosts. The output is taken from the positive output of the summing stage 120 in all cases, but the negative feedback signal is switchable between the positive and negative outputs of the summer. In this way when the ghost is, for example, positive, a positive signal will be delayed and attenuated by the delay and gain factor means and applied to the negative input of the summer. It will therein be subtracted from the desired signal and only the desired signal will remain. If, however, the ghost is a negative ghost the negative output of the summer will be delayed and attenuated as hereinbefore described applied to the negative input where in fact it will, due to the fact that two negative operators appear in series appears as a positive signal added to the desired signal thus cancelling the negative ghost.

A ghost canceller in accordance with this invention having electrically adjustable delay means for the cancellation of ghosts makes possible the interconnection thereof with a television receiver in such a way that several methods for simplifying the operations thereof are possible. For example, while in FIG. 2 a variable resistor is shown as providing means for adjusting the frequency of the clock generator in one embodiment of this invention, a separate and distinct resistor is utilized for each channel normally received on the television receiver to which a ghost suppressor in accordance with this invention is applied, and a switch which is adapted to be connected to the channel selector means associated with the television receiver is provided to select a different clock generator frequency adjustment potentiometer for each channel. It is thereby possible to provide preset delay times for each channel. This arrangement is especially useful in configurations where the television receiver is installed in a fixed location and the ghost signals received thereat are substantially constant in amplitude and delay time. It is to be understood that the switchable changes in delay time may also be provided by selecting output taps on the charge transfer delay lines corresponding to the delay times required as illustrated at FIG. 7. This selection may also be accomplished in combination with the selection of the channel to be viewed on the television receiver. FIG. 7 illustrates an embodiment of this invention wherein switch means are associated with the channel selector means of a television receiver to select output taps and/or frequency setting resistors as hereinabove described. Delay line 132 is of the type illustrated hereinabove in conjunction with FIG. 3, clock generator 39 is of the type illustrated in conjunction with FIG. 2, and summer 130 is likewise of the type hereinabove described in conjunction with FIGS. 1, 2, 4 or 5 as desired. Either or both of switch means 140 or 142 is operatively associated with channel selector means 145 to provide for a change in delay time, either through varying the length of delay line 132 or the frequency of clock generator 139, when a different channel is selected. A ghost canceller in accordance with this invention offers substantial cost savings over prior art types. Both the charge coupled delay lines and the bucket-brigade delay lines hereinabove described are suitable for fabrication in integrated circuit form, and in the embodiments thereof wherein push-pull or other multiple delay lines are required, single chip implementation provides lower fabrication costs, and reduced complexity of interconnection. Electronic control of delay time makes possible remote control of a ghost canceller in accordance with this invention without complicated electromechanical systems which would be required for delay lines of the type heretofore utilized. Further, infinitely variable delay times are achieved, switching problems and the like are substantially eliminated, and positive and negative, as well as multiple ghosts are easily accommodated as hereinabove described.

While the invention has been particularly shown and described with reference to several preferred embodiments thereof, it will be understood by those skilled in the art that various changes in form and detail may be made therein without department from the true spirit and scope of the invention as defined by the appended claims.

What is claimed is:

1. A ghost suppressor for inclusion in the video signal path of a television receiver of the type including channel selector means comprising:

summing means including an electrical output and a plurality of electrical inputs; a first of said electrical inputs and said electrical output comprising the input and output respectively of said ghost suppressor and connected in series circuit relationship in said video signal path;

multistage monolithic integrated circuit charge transfer delay line means, said delay line means including an input and a plurality of output taps, each of said output taps including a preselected number of delay line stages between it and said input;

switch means coupled with said channel selector means for selecting one of said plurality of output taps in each position of said channel selector means;

variable gain means connected in series circuit relationship with said plurality of output taps; said delay line, gain means and switch means connected in feedback circuit relationship with said summing means;

variable frequency digital clock means having a first output, said first output characterized by a generally square wave signal, said first output connected to said delay line means for causing signals appearing at said input of said delay line means to be sampled, held and delayed in their propagation therethrough, the delay time being controllable by varying the frequency of said clock means, said delay time being further controllable by the selecting one of said plurality of output taps by said switch means in response to said channel selector means; said delayed signal in combination with said video signal appearing at said electrical output of said summing means being said video signal as a function of time multiplied by the transfer function $1/(1 + \alpha e^{-j2\pi f \tau})$.

* * * * *